(12) United States Patent
Liu

(10) Patent No.: US 9,729,271 B2
(45) Date of Patent: Aug. 8, 2017

(54) METHOD AND APPARATUS FOR UPLINK DATA TRANSMISSION, USER EQUIPMENT, COMPUTER PROGRAM AND STORAGE MEDIUM

(75) Inventor: Yu Liu, Beijing (CN)

(73) Assignee: Optis Circuit Technology, LLC, Plano, TX (US)

( * ) Notice: Subject to any disclaimer, the term of this patent is extended or adjusted under 35 U.S.C. 154(b) by 301 days.

(21) Appl. No.: 14/372,051

(22) PCT Filed: Feb. 13, 2012

(86) PCT No.: PCT/CN2012/071070
§ 371 (c)(1),
(2), (4) Date: Jul. 14, 2014

(87) PCT Pub. No.: WO2013/120245
PCT Pub. Date: Aug. 22, 2013

(65) Prior Publication Data
US 2015/0078268 A1    Mar. 19, 2015

(51) Int. Cl.
*H04L 1/00* (2006.01)
*H04L 1/20* (2006.01)
*H04L 5/14* (2006.01)

(52) U.S. Cl.
CPC .......... *H04L 1/0007* (2013.01); *H04L 1/0019* (2013.01); *H04L 1/203* (2013.01); *H04L 5/1469* (2013.01)

(58) Field of Classification Search
None
See application file for complete search history.

(56) References Cited

U.S. PATENT DOCUMENTS

| 9,357,562 B2* | 5/2016 | Quan | ............... H04W 52/0216 |
| 2007/0133458 A1* | 6/2007 | Chandra | ............... H04L 1/0025 370/329 |

(Continued)

FOREIGN PATENT DOCUMENTS

| CN | 1870784 A | 11/2006 |
| CN | 102196546 A | 9/2011 |

(Continued)

OTHER PUBLICATIONS

International Search Report issued in corresponding International application No. PCT/CN2012/071070, date of mailing Nov. 8, 2012.

(Continued)

*Primary Examiner* — Shaq Taha
*Assistant Examiner* — Ronald H Davis
(74) *Attorney, Agent, or Firm* — Spencer C. Patterson; Grable Martin Fulton PLLC

(57) ABSTRACT

The present invention relates to method and apparatus for uplink data transmission, a user equipment, a computer program and a storage medium. The method comprises: acquiring a data error rate of data blocks transmitted on an uplink of a UE; constructing a new data block, wherein a size of the new data block is smaller than the size of the transmitted data block currently, if the block error rate is greater than a threshold; and transmitting the new data block on the uplink of the UE according to a first power currently allocated to the UE. The present invention can enhance the performance of uplink data transmission.

17 Claims, 9 Drawing Sheets

(56) References Cited

U.S. PATENT DOCUMENTS

| | | | | |
|---|---|---|---|---|
| 2009/0103511 | A1* | 4/2009 | Marinier | H04L 47/36 370/345 |
| 2009/0276674 | A1* | 11/2009 | Wei | H04L 1/16 714/749 |
| 2009/0290559 | A1* | 11/2009 | Pelletier | H04L 1/189 370/336 |
| 2010/0309865 | A1* | 12/2010 | Kimura | H04L 1/0001 370/329 |
| 2011/0075611 | A1* | 3/2011 | Choi | H04L 1/1819 370/329 |
| 2015/0078268 | A1* | 3/2015 | Liu | H04L 1/0007 370/329 |

FOREIGN PATENT DOCUMENTS

| | | | | |
|---|---|---|---|---|
| EP | 2 273 710 A1 | | 1/2011 | |
| WO | WO 2011/079814 | * | 7/2011 | H04W 4/00 |

OTHER PUBLICATIONS

Written Opinion of the International Searching Authority issued in corresponding International application No. PCT/CN2012/071070, date of mailing Nov. 8, 2012.

* cited by examiner

METHOD AND APPARATUS FOR UPLINK DATA TRANSMISSION, USER EQUIPMENT, COMPUTER PROGRAM AND STORAGE MEDIUM

TECHNICAL FIELD

The present invention relates to a mobile communication field, and in particular to method and apparatus for uplink data transmission, a user equipment, a computer program and a storage medium.

BACKGROUND

Even though embodiments of the invention will be described herein in relation to TD-SCDMA, it should be noted that embodiments of the invention may be equally applicable in any scenario with ACK/NACK functionality and variable block size. Thus, the invention is not limited to TD-SCDMA.

TD-SCDMA is one of the four UMTS standards (the others are WCDMA, CDMA2000 and WIMAX). TD-SCDMA is based on TDD (Time Division Duplex) while WCDMA is based on FDD (Frequency Division Duplex). In a 3GPP R99 version, a TD-SCDMA system has a downlink data rate of 384 kbps and an uplink data rate of 64 kbps. In a 3GPP R5 version, HSDPA (High Speed Downlink Packet Access) is introduced into TD-SCDMA, thus the downlink data rate is increased to 2.8 Mbps and the uplink data rate is increased to 384 kbps. In a subsequent 3GPP R7 version, HSUPA (High Speed Uplink Packet Access) is introduced into TD-SCDMA, and as a result, the uplink data rate is increased to 2.2 Mbps. This technology is called as TD-HSUPA, so as to be differentiated from HSUPA in WCDMA.

At a UE (User Equipment) side, when a HSUPA service is established, if there exist physical resources (including uplink TX power, time slot and code channel) on an E-AGCH (Enhanced-Absolute Grant Channel, which is a downlink physical channel and carries the physical sources for the uplink at a current TTI) at a current TTI (Transmission Time Interval, with a value of 5 ms), a MAC layer will construct a data block called as MAC-e PDU based on the physical resources, and transmits the MAC-e PDU on an E-PUCH (Enhanced-Physical Uplink Channel, which is an uplink physical channel and carries an uplink data block MAC-e PDU of the UE) to Node B at the current TTI. After several TTIs, the UE will receive feedback messages via an E-HICH (Enhanced-Hybrid Indication Channel, which is a downlink physical channel and carries the feedback messages ACK/NACK indicating whether the data block MAC-e PDU transmitted on the uplink is successfully decoded or not) which carries ACK/NACK. If the received feedback message is ACK, the MAC layer will flush the MAC-e PDU data block, and if the received feedback message is NACK, the MAC layer will try to retransmit the data block MAC-e PDU when there exist sufficient physical resources.

In the process of the practical test, it is found that the size of the MAC-e PDU data block constructed by the MAC layer has direct relationship with ACK/NACK indicated on the E-HICH. The bigger the MAC-e PDU data block, the harder the receiving of ACK from Node B. In contrast, the smaller the MAC-e PDU data block, the easier the receiving of ACK from Node B.

When it is found at a network side that there exist many big uplink data blocks at the UE, usually more uplink transmission power is allocated to the UE so as to increase transmission success ratio. However, it is unable to solve this problem merely by increasing the uplink transmission power. Generally speaking, (1) if being provided with more uplink transmission power, the UE will construct a bigger MAC-e PDU using a 16QAM mode. However, due to constraints of Node B (there exist some constraints when a network manufacturer allows a current Node B to decode a data block of the 16QAM mode), decoding error will occur even when the uplink TX power of the UE is increased. (2) Due to complexity of the wireless environment, a bigger data block will be affected more than a smaller data block during the transmission. However, it is impossible to solve this problem by increasing the TX power of the UE.

SUMMARY

The present invention discloses method and apparatus for uplink data transmission, a UE, a computer program and a storage medium, so as to enhance the performance of the uplink data transmission of the UE.

In some embodiments of the present invention, a block error rate of data blocks transmitted on an uplink of a UE is acquired. If the block error rate is greater than a threshold, a new data block will be constructed. A size of the new data block is smaller than the size of the transmitted data blocks. The new data block is transmitted on the uplink of the UE according to a first power currently allocated to the UE, so as to increase success ratio of the uplink data transmission at the UE, thereby to enhance the performance of the uplink data transmission.

In some embodiments of the present invention, a block error rate of the transmitted data blocks on the uplink of the UE is acquired according to feedback messages from a network side with respect to the transmitted data blocks on the uplink of the UE.

In some embodiments of the present invention, a number of NACKs indicating that the data blocks are not received successfully at the network side is acquired from a first number of the received feedback messages from the network side with respect to the transmitted data blocks on the uplink of the UE. Determining a ratio of the number of NACKs to the first number is acquired as a block error rate of the transmitted data blocks on the uplink of the UE.

In some embodiments of the present invention, if the block error rate is greater than a threshold, the first power currently allocated to the UE is decreased to obtain a second power, and a new data block is constructed according to the second power. The size of the new data block is smaller than the size of the transmitted data block.

In some embodiments of the present invention, the size of the new data block may be determined according to the following formula of 3 G:

$$MACe\_Size = coderate * (4*(Timeslot\_Number*704/CodeChannel\_Number - 17*UCCH\_Number)),$$

Wherein MACe_Size is a size of the new data block, coderate is determined according to the second power and the number of code channels, Timeslot_Number is the number of time slots, CodeChannel_Number is the number of code channels, and UCCH_Number is the number of UCCHs. Each of Timeslot_Number, CodeChannel_Number and UCCH_Number has a fixed value.

In some embodiments of the present invention, a size of the largest data block among the data blocks of a second number of the transmitted data blocks on the uplink of the UE whose feedback message is ACK. The ACK indicates that a corresponding data block is received successfully at the network side, wherein the second number is equal to the first number. If the new data block has a size greater than the largest data block among the data blocks whose feedback message is ACK, the new data block is constructed according to the size of the largest data block among the data blocks whose feedback message is ACK. The new data block will be more likely to be received successfully at the network side, and thereby the performance of the uplink data transmission of the UE is enhanced.

Of course, the present invention is not limited to the above features and advantages. Actually, a person skilled in the art will understand other features and advantages of the present invention by reading the following embodiments and drawings.

DETAILED DESCRIPTION

Figure 1:
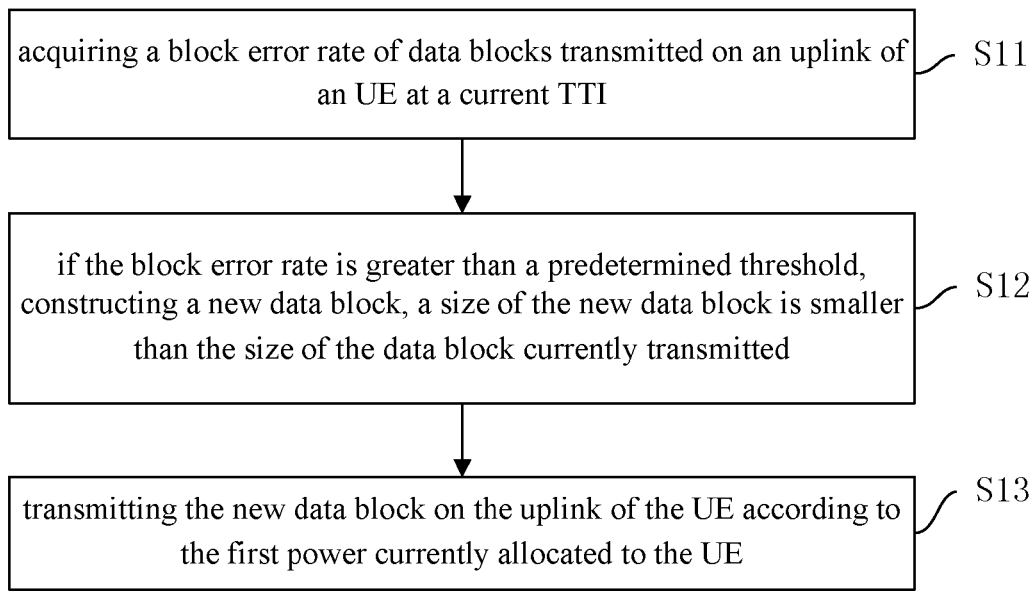
FIG. 1 is a basic flow chart showing a method for uplink data transmission according to the embodiments of the present invention.

As shown in FIG. 1, in one embodiment of the present invention, a method for uplink data transmission includes:

Step 11: acquiring a block error rate of data blocks transmitted on an uplink of an UE. Said step 11 includes acquiring the block error rate of the transmitted data blocks on the uplink of the UE at the current TTI according to feedback messages from a network side with respect to the transmitted data blocks on the uplink of the UE;

Step 12: if the block error rate is greater than a threshold, constructing a new data block, wherein a size of the new data block is smaller than the size of the transmitted data blocks. Said step 12 includes, if the block error rate is greater than the threshold, obtaining a second power by decreasing a first power currently allocated to the UE, and determining the size of the new data block according to the second power, wherein the second power determines the size of the new data block; and constructing a new data block according to the size of the new data block; and Step 13: transmitting the new data block on the uplink of the UE according to the first power currently allocated to the UE.

In this embodiment, the new data block is constructed when it is judged that the block error rate of the transmitted data blocks on the uplink of the UE is greater than the threshold. The size of the new data block is smaller than the size of the transmitted data blocks, and the new data block is transmitted according to the first power currently allocated. In such way, a smaller data block is transmitted with a bigger power so as to enhance the performance of the uplink data transmission of the UE.

Figure 2:
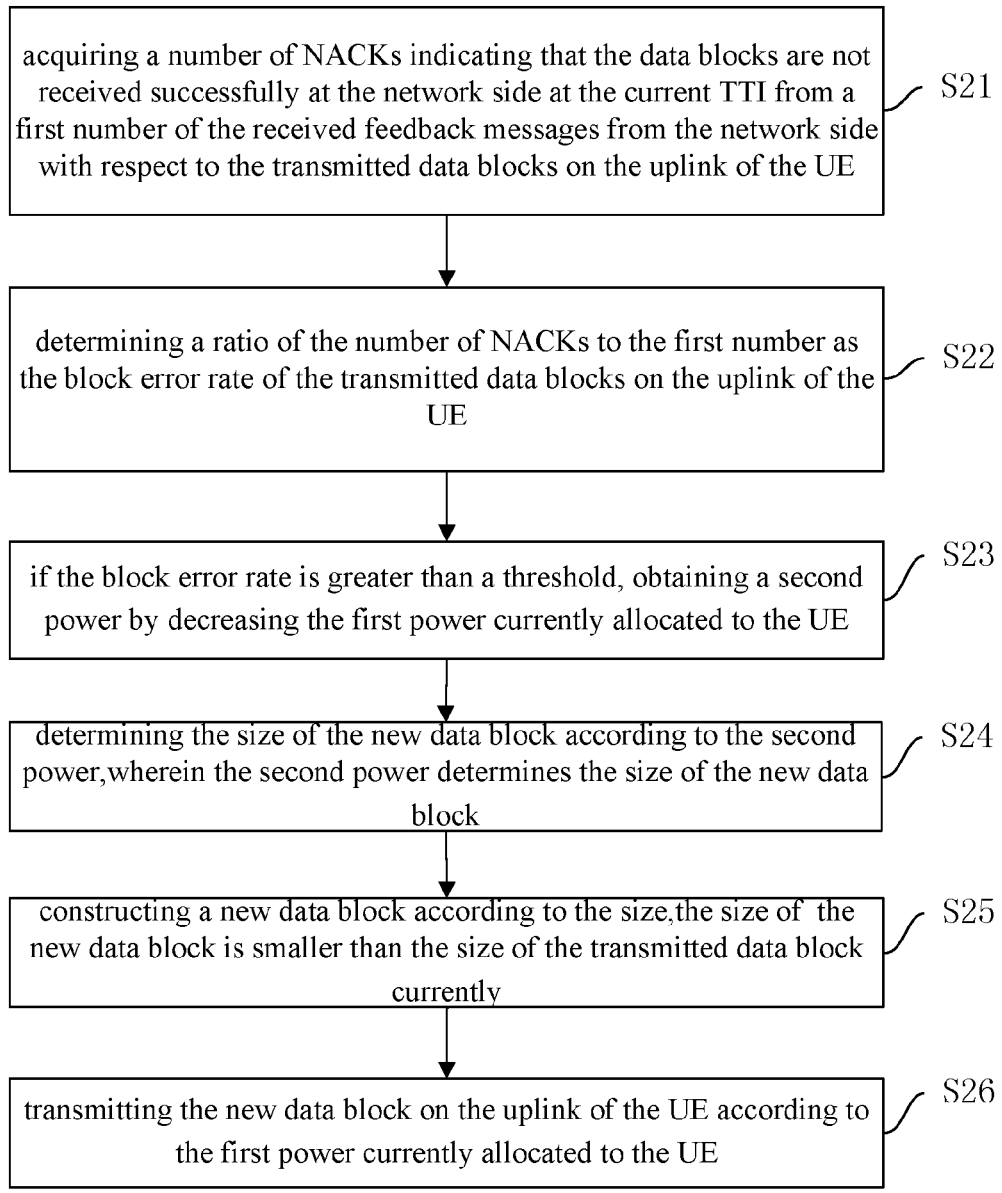
FIG. 2 is a specific flow chart showing a method for uplink data transmission according to the embodiments of the present invention.

As shown in FIG. 2, in another embodiment of the present invention, a method for uplink data transmission includes:

Step 21: acquiring a number of NACKs indicating that the data blocks are not received successfully at the network side at the current TTI from a first number of the received feedback messages from the network side with respect to the transmitted data blocks on the uplink of the UE;

Step 22: determining a ratio of the number of NACKs to the first number as the block error rate of the transmitted data blocks on the uplink of the UE;

Step 23: if the block error rate is greater than a threshold, obtaining a second power by decreasing the first power currently allocated to the UE; the threshold may be any value, e.g., a range of the value is 0-30%;

Step 24: determining the size of the new data block according to the second power, wherein the second power determines the size of the new data block;

Step 25: constructing the new data block according to the size, the size of the new data block is smaller than the size of the transmitted data block currently; wherein, the size of the new data block may be determined according to the second power using the following formula of 3 G:

MACe_Size=coderate*(4*(Timeslot_Number*704/ CodeChannel_Number−17*UCCH_Number))

Wherein, MACe_Size is a size of the new data block, coderate is determined according to the second power and the number of code channels, Timeslot_Number is the number of time slots, CodeChannel_Number is the number of code channels, and UCCH_Number is the number of the UCCHs. Each of the Timeslot_Number, CodeChannel_Number and UCCH_Number has a fixed value. Wherein coderate is calculated according to the second power and the number of code channels. In a normal HSUPA service, the number of time slots, the number of code channels, and UCCH_Number are all fixed, and merely the power is variable. Change of the power causes change of coderate, thereby causes change of the size of the data block (MACe_Size);

Step 26: transmitting the new data block on the uplink of the UE according to the first power currently allocated to the UE.

In this embodiment, acquiring the number of NACKs from the first number of the received feedback messages from the network side, and determining a ratio of the number of NACKs to the first number as the block error rate of the transmitted data blocks on the uplink. The first number may be any number of the received feedback messages from the network side at the current TTI, e.g., 50, 45, 30, and etc.

Figure 3:
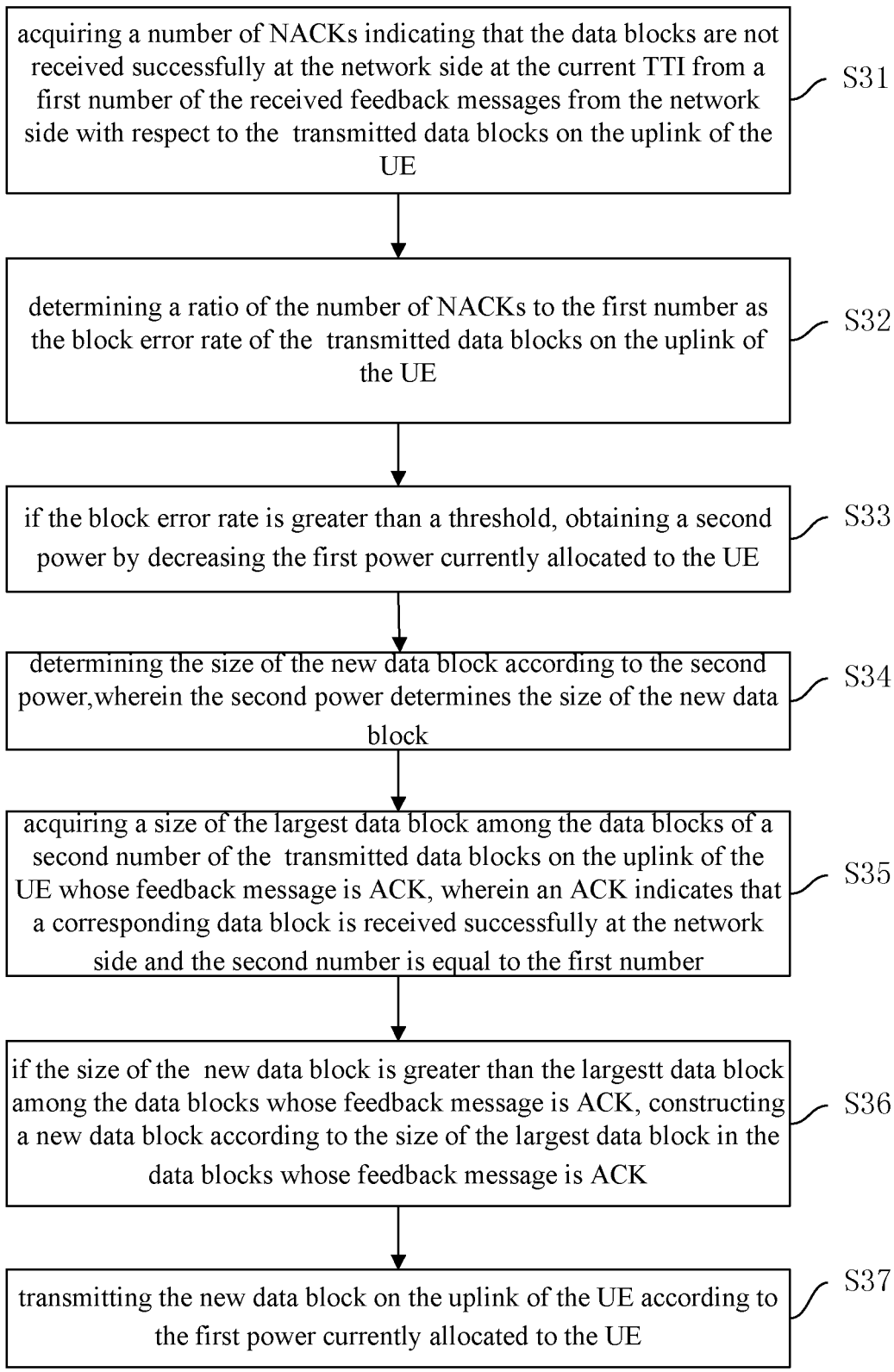
FIG. 3 is another specific flow chart showing a method for uplink data transmission according to the embodiments of the present invention.

As shown in FIG. 3, in another embodiment of the present invention, a method for uplink data transmission includes:

Steps 31-34: they are same as Steps 21-24 in the above embodiment;

Step 35: acquiring a size of the largest data block among the data blocks of a second number of the transmitted data blocks on the uplink of the UE whose feedback message is ACK, wherein an ACK indicates that a corresponding data block is received successfully at the network side, and the second number is equal to the first number;

Step 36: if the size of the new data block is greater than the size of the largest data block in the data blocks whose feedback message is ACK, constructing the new data block according to the size of the largest data block in the data blocks whose feedback message is ACK; and Step 37: transmitting the reconstructed new data block on the uplink of the UE according to the first power currently allocated to the UE.

In this embodiment, if the size of the data block calculated according to the decreased second power is greater than the size of the largest data block in the data blocks which are received successfully at the network side and whose feedback message is ACK, the new data block is constructed according to the size of the largest data block in the data blocks whose feedback message is ACK. The new data block may be transmitted to the network side according to the first power currently allocated, and as a result, it is easier to receive the new data successfully, thereby the performance of the uplink data transmission will be enhanced.

Figure 4:
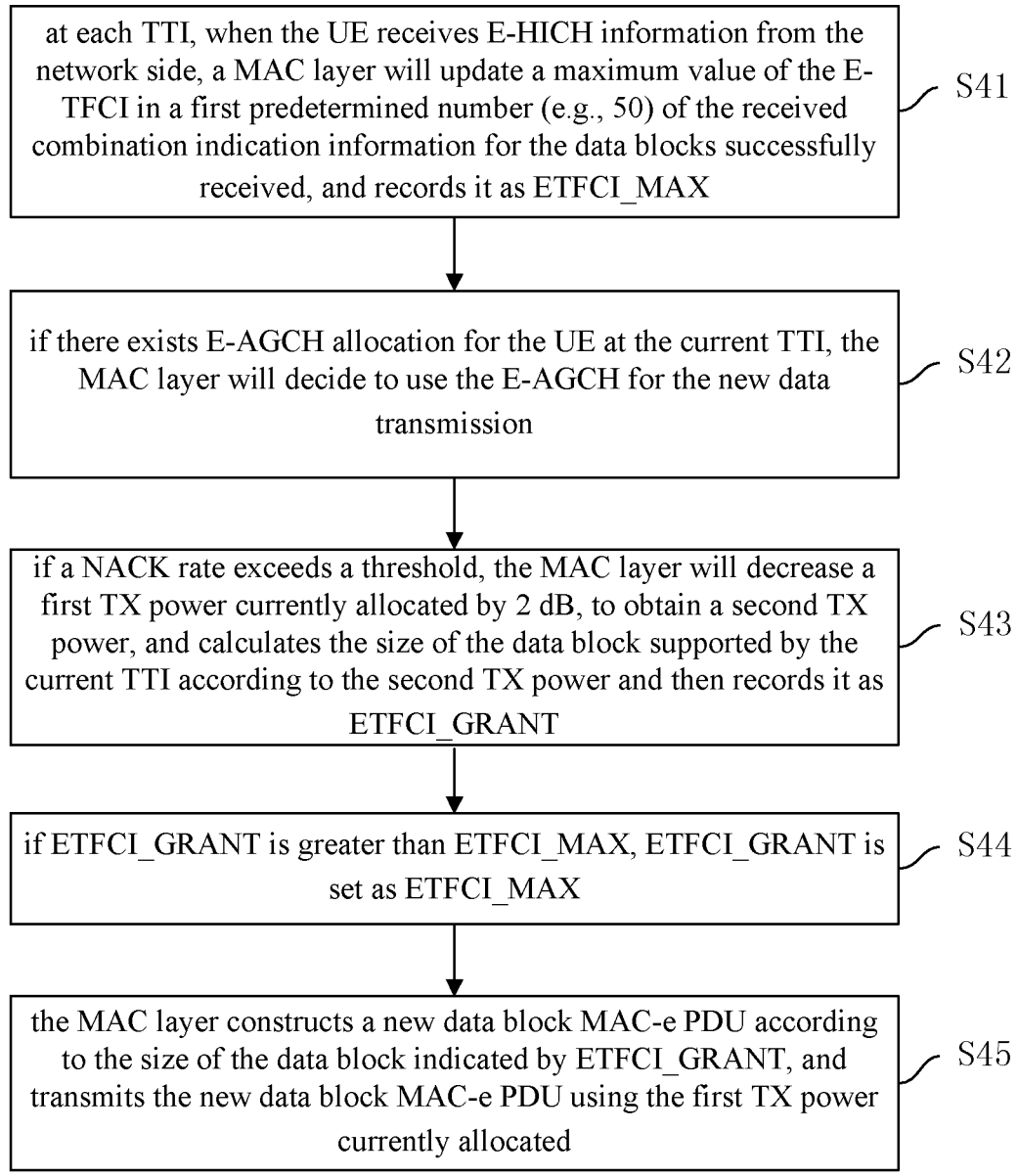
FIG. 4 is a flow chart showing a method for uplink data transmission in a specific application example according to the embodiments of the present invention.

FIG. 4 shows a specific example of embodiments of the present invention. In a TD-SCDMA communication system, E-TFCI (Enhanced-Transport Format Combination Indication) is an index for MAC-e PDU, ranging from 0 to 63, wherein 63 indicates a maximum data block.

E-HICH (Enhanced-Hybrid Indication Channel) is a downlink physical channel which carries ACK/NACK for the MAC-e PDU data blocks transmitted on the uplink of the UE.

E-AGCH (Enhanced-Absolute Grant Channel) is a downlink physical channel which carries physical resources allocated for the uplink at a current TTI. It includes the allocated TX power, the code channels and the time slot.

E-PUCH (Enhanced-Physical Uplink Channel) is an uplink physical channel which carries the data blocks MAC-e PDU transmitted on the uplink of the UE.

In the specific example, a method for uplink data transmission includes:

Step 41: at each TTI, when the UE receives E-HICH information from the network side, a MAC layer will update a maximum value of the E-TFCI in a first number (e.g., 50) of the received combination indication information for the data blocks successfully received, and records it as ETFCI_MAX. Namely, it determines the size of the biggest data block in the first number of the transmitted data blocks;

Step 42: if there exists E-AGCH allocation for the UE at the current TTI, the MAC layer will decide to use the E-AGCH for the new data transmission;

Step 43: if a NACK rate exceeds a threshold, the MAC layer will decrease a first TX power currently allocated, e.g., by 2 dB, to obtain a second TX power, i.e., the second TX power=the first TX power −2 dB, and calculates the size of the data block supported by the current TTI according to the second TX power and then records it as ETFCI_GRANT;

Step 44: if ETFCI_GRANT is greater than ETFCI_MAX, ETFCI_GRANT is set as ETFCI_MAX; and Step 45: the MAC layer constructs a new data block MAC-e PDU according to the size of the data block indicated by ETFCI_GRANT, and transmits the new data block MAC-e PDU using the first TX power currently allocated.

Figure 5:
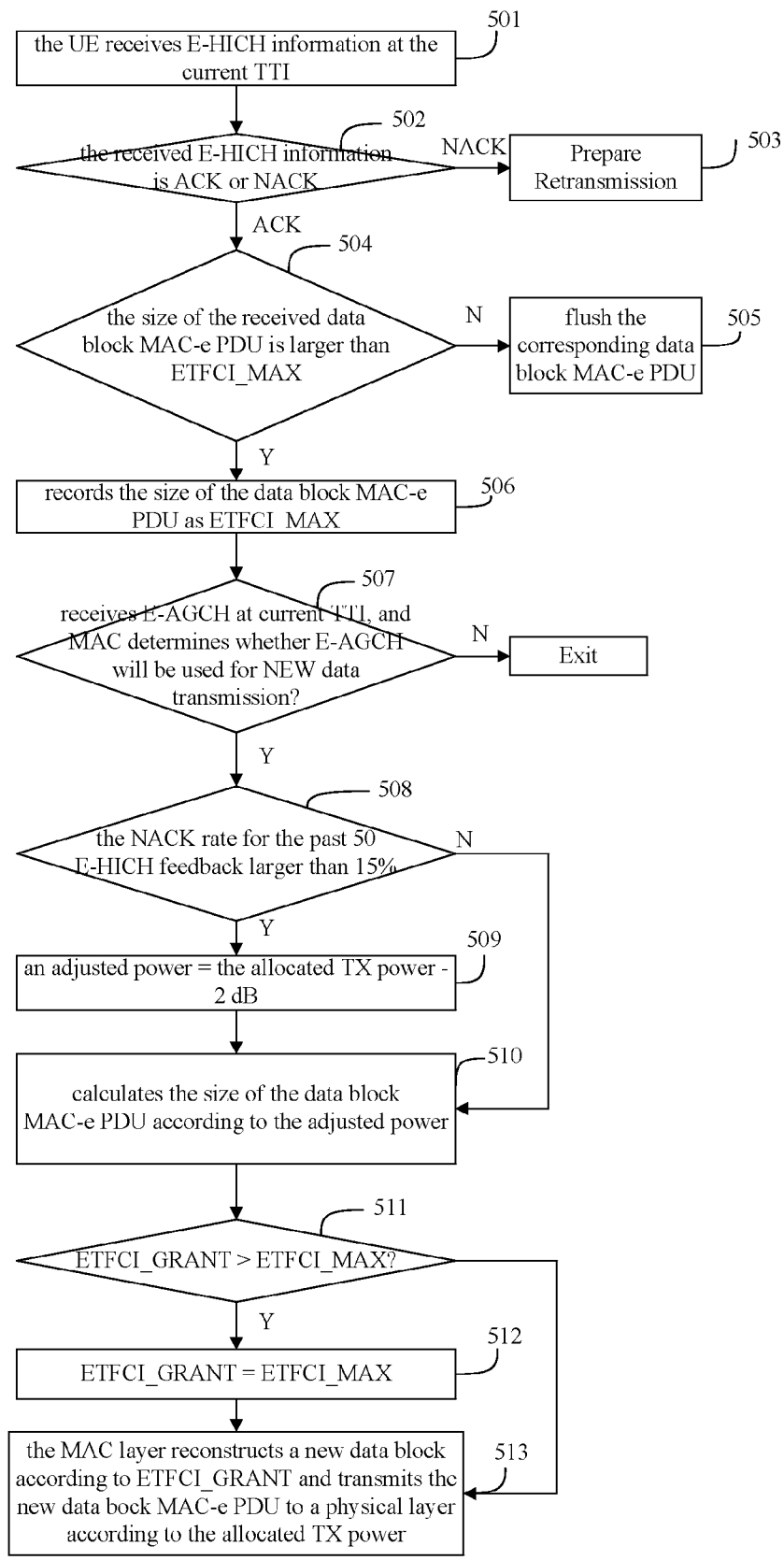
FIG. 5 is a flow chart showing a method for uplink data transmission in another specific application example according to the embodiments of the present invention.

FIG. 5 shows another specific example of embodiments of the present invention. In a TD-SCDMA communication system, a method for uplink data transmission includes:

Step 501: the UE receives E-HICH information at the current TTI;

Step 502: the UE judges whether the received E-HICH information is ACK or NACK;

Step 503: if the UE determines that the received E-HICH information at the current TTI is NACK, the MAC layer will transmit the data block MAC-e PDU when there exist sufficient physical resources;

Step 504: if the UE determines that the received E-HICH information with respect to a certain data block MAC-e PDU at the current TTI is ACK, the MAC layer will check whether the size of the received data block MAC-e PDU is larger than ETFCI_MAX or not;

Step 505: if not, the MAC layer will flush the corresponding data block MAC-e PDU;

Step 506: if yes, the MAC layer will update ETFCI_MAX and record the size of the data block MAC-e PDU whose feedback message is ACK as ETFCI_MAX;

Step 507: if the UE receives the allocation information of E-AGCH at the current TTI, the MAC layer will determine whether to use the E-AGCH to transmit the new data block, and if not, it will exit;

Step 508: if yes, the MAC layer checks whether the NACK rate for the first number (e.g., 50) of the received E-HICH information is larger than 15% (a threshold, which of course is not limited to 15% and may be any other values), and if not, it turns to Step 510;

Step 509: if yes, the allocated TX power will be decreased, e.g., by 2 dB, namely, an adjusted power=the allocated TX power −2 dB;

Step 510: the MAC layer calculates the size of the data block MAC-e PDU according to the adjusted power, wherein the size (MACe_Size) of the data block MAC-e PDU may be calculated according to the power, the number (Timeslot_number) of time slots and the number (CodeChannel_Number) of code channels using the following formula:

$$MACe\_Size = coderate * (4 * (Timeslot\_Number * 704 / CodeChannel\_Number - 17 * UCCH\_Number))$$

Wherein coderate is calculated according to the power and the number of code channels. In a normal HSUPA service, the number of time slots, the number of code channels and UCCH_Number are all fixed, and merely the power is variable. Change of the power causes change of coderate, thereby causes change of MACe_Size;

Step 511: determining whether the calculated size of the new data block ETFCI_GRANT is larger than ETFCI_MAX;

Step 512: if yes, ETFCI_GRANT is set as ETFCI_MAX; and

Step 513: the MAC layer constructs a new data block according to ETFCI_GRANT and transmits the new data bock MAC-e PDU to a physical layer according to the allocated TX power, and the physical layer transmits the new data bock MAC-e PDU to Node B to complete the procedure.

According to the above-mentioned embodiments of the present invention, the performance of HSUPA uplink data transmission will be enhanced. It will be very useful especially in bad wireless environment. In some cases, the network has a poor decoding performance for a big data block, thus it is necessary to take some measures for the UE, so as to decrease the size of the data block to be transmitted under the circumstances where a good uplink data transmission rate is maintained. According to the above-mentioned embodiments of the present invention, a big power is used to transmit a small data block, and as a result, the smaller data block will be more likely received successfully by Node B. The advantage of this method in test field is obvious, and it can ensure the HSUPA data rate and maintain good performance.

Figure 6:
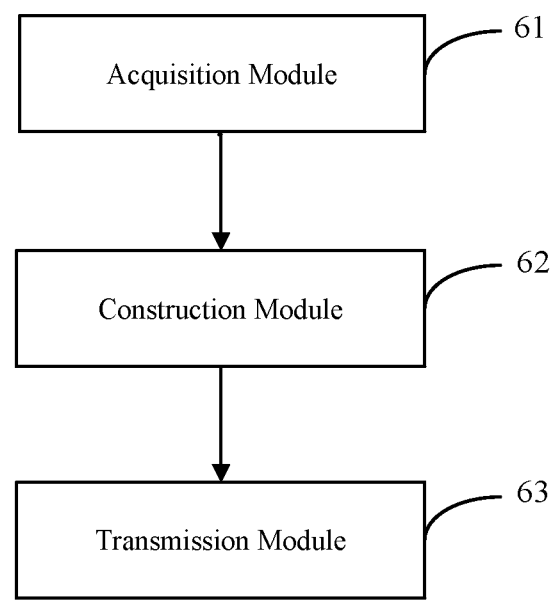
FIG. 6 is a basic block diagram showing the structure of an apparatus for uplink data transmission according to the embodiments of the present invention.

As shown in FIG. 6, the present invention further provides an apparatus for uplink data transmission, which includes:

an acquisition module 61 configured to acquire a block error rate of data blocks transmitted on an uplink of UE, wherein the acquisition module 61 may acquire the block error rate of the transmitted data blocks on the uplink of the UE at the current TTI according to feedback messages from the network side with respect to the transmitted data blocks on the uplink of the UE;

a construction module 62 configured to construct a new data block if the block error rate is greater than a threshold, wherein a size of the new data block is smaller than the size of the transmitted data blocks; and a transmission module 63 configured to transmit the new data block on the uplink of the UE according to the first power currently allocated to the UE.

This embodiment can achieve the same technical effect as the embodiment as shown in FIG. 1.

Figure 7:
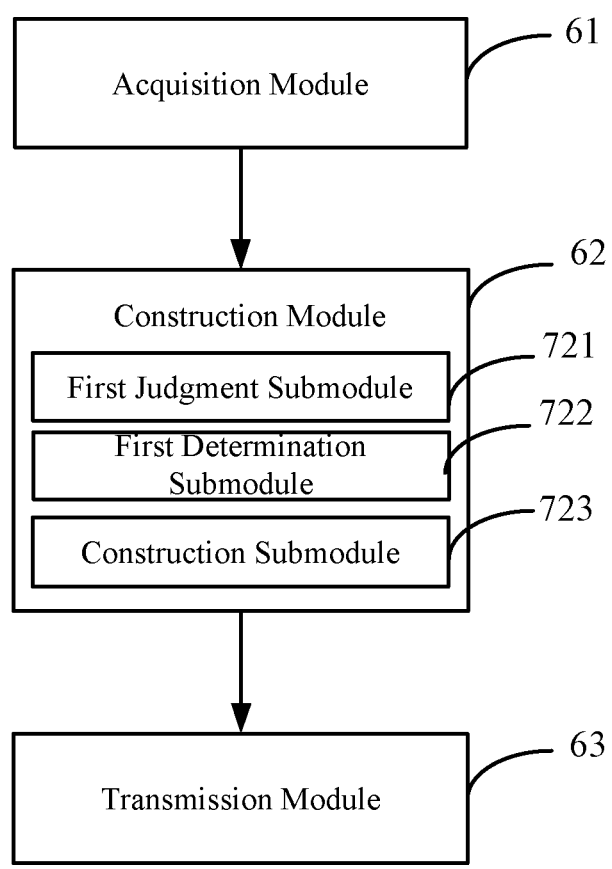
FIG. 7 is a specific block diagram showing the structure of an apparatus for uplink data transmission according to the embodiments of the present invention.

In another embodiment of the present invention as shown in FIG. 7, the construction module 62 may include:

a first judgment submodule 721 configured to decrease a first power currently allocated to the UE to obtain a second power if the block error rate is greater than the threshold;

a first determination submodule 722 configured to determine the size of the new data block according to the second power, wherein the second power determines the size of the new data block; and a construction submodule 723 configured to construct the new data block according to the size of the new data block.

This embodiment can also achieve the same technical effect as the embodiment as shown in FIG. 1.

Figure 8:
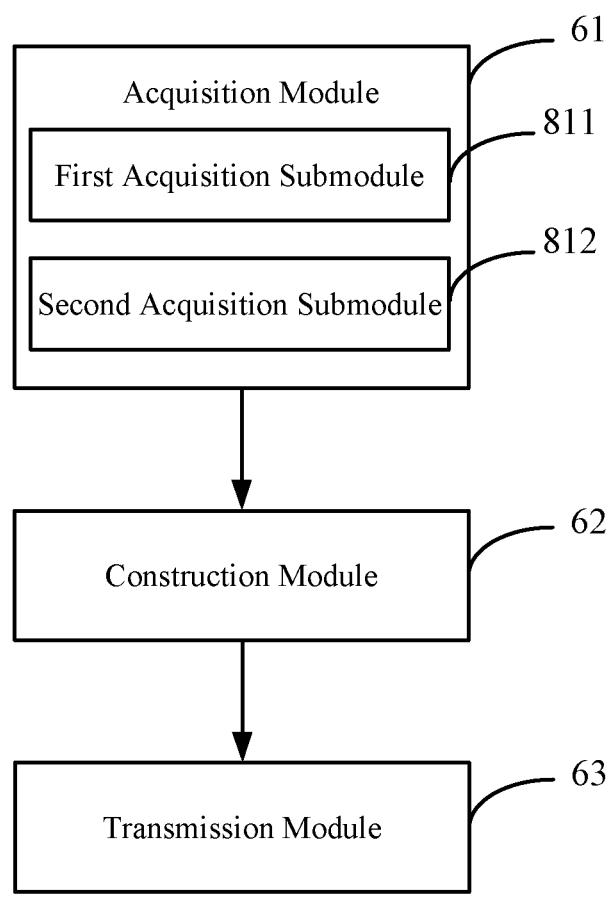
FIG. 8 is a specific block diagram showing the structure of an apparatus for uplink data transmission according to the embodiments of the present invention.

In another embodiment of the present invention as shown in FIG. 8, the acquisition module 61 may include:

a first acquisition submodule 811 configured to acquire a number of NACKs indicating that the data blocks are not received successfully at the network side at the current TTI from a first number of the received feedback messages from the network side with respect to the transmitted data blocks on the uplink of the UE; and a second acquisition submodule 812 configured to determine a ratio of the number of NACKs to the first number as the block error rate of the transmitted data blocks on the uplink of the UE.

This embodiment can achieve the same technical effect as the embodiment as shown in FIG. 2.

In the above-mentioned embodiments, the first determination submodule 722 is configured to determine the size of the new data block using the following formula of 3 G:

$$MACe\_Size = coderate*(4*(Timeslot\_Number*704/CodeChannel\_Number - 17*UCCH\_Number))$$

Wherein, MACe_Size is a size of the new data block, coderate is determined according to the second power and a number of code channels, Timeslot_Number is the number of time slots, CodeChannel_Number is the number of code channels, and UCCH_Number is the number of UCCHs. Each of Timeslot_Number, CodeChannel_Number and UCCH_Number has a fixed value.

Figure 9:
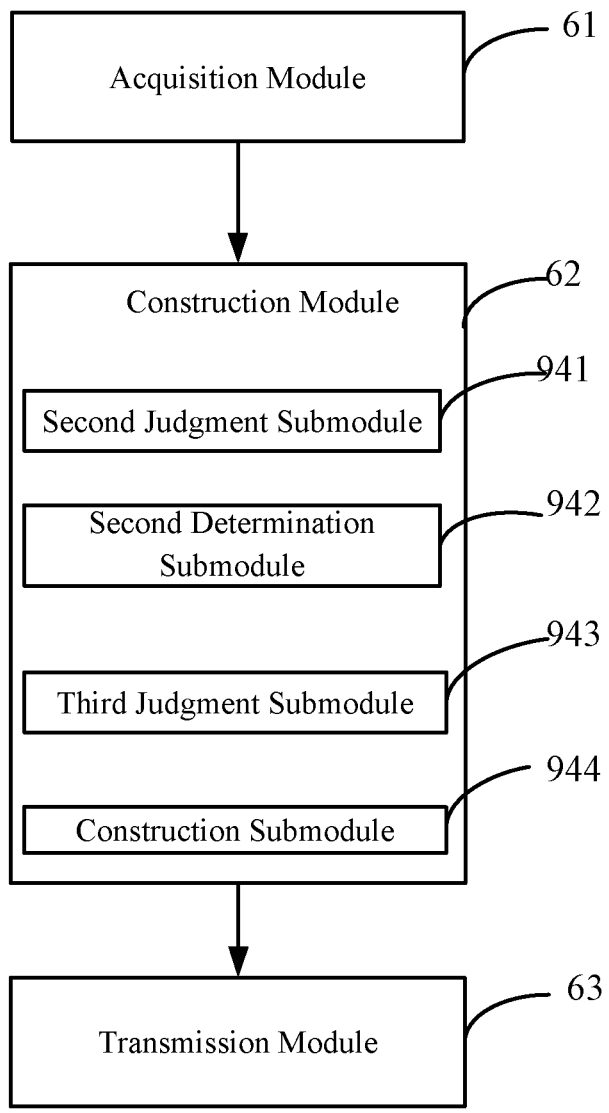
FIG. 9 is a specific block diagram showing the structure of an apparatus for uplink data transmission according to the embodiments of the present invention.

In another embodiment of the present invention as shown in FIG. 9, the apparatus may further include a reconstruction module 94, which includes:

a second judgment submodule 941 configured to decrease the first power currently allocated to the UE to obtain a second power, if the block error rate is greater than the threshold;

a second determination submodule 942 configured to determine the size of the new data block according to the second power, wherein the second power determines the size of the new data block;

a third judgment submodule 943 configured to acquire a size of the largest data block among the data blocks of a second number of data blocks transmitted on the uplink of the UE whose feedback message is ACK from, an ACK indicates a corresponding data block is received successfully at the network side, wherein the second number is equal to the first number; and a construction submodule 944 configured to reconstruct the new data block according to the size of the largest data block among the data blocks whose feedback message is ACK, if the size of the new data block is greater than the size of the largest data block among the data blocks whose feedback message is ACK.

This embodiment can achieve the same technical effect as the method as shown in FIG. 3.

The present invention further provides an UE including the apparatus of the above-mentioned embodiments of the present invention.

Corresponding to the method for the uplink data transmission, the present invention further provides a computer program. The computer program includes a program code stored in a computer-readable storage medium, and can be loaded by a processor to implement the above-mentioned method.

The present invention further provides a storage medium storing the above-mentioned computer program.

what is claimed is:

1. A method for uplink data transmission, comprising:
acquiring a data error rate of data blocks transmitted on an uplink of a UE;
constructing a new data block, wherein a size of the new data block is smaller than the size of the transmitted data blocks if the block error rate is greater than a threshold and constructing the new data block comprises:
acquiring a size of the largest data block among the data blocks of a first number of the transmitted data blocks on the uplink of the UE whose feedback message is ACK, wherein an ACK indicates that a corresponding data block is received successfully at the network side; and
constructing the new data block according to the size of the largest data block among the data blocks whose feedback message is ACK; and
transmitting the new data block on the uplink of the UE according to a first power currently allocated to the UE.

2. The method for uplink data transmission according to claim 1, wherein the step of acquiring the data error rate of data blocks transmitted on the uplink of the UE comprises:
acquiring a block error rate of the transmitted data blocks on the uplink of the UE according to feedback messages from a network side with respect to the transmitted data blocks on the uplink of the UE.

3. The method for uplink data transmission according to claim 2, wherein the step of acquiring the block error rate of the transmitted data blocks on the uplink of the UE according to feedback messages from the network side with respect to the transmitted data blocks on the uplink of the UE comprises:

acquiring a number of NACKs indicating that the data blocks are not received successfully at the network side from a second number of the received feedback messages from the network side with respect to the transmitted data blocks on the uplink of the UE; and determining a ratio of the number of NACKs to the second number as the block error rate of the transmitted data blocks on the uplink of the UE.

4. The method for uplink data transmission according to claim 3, wherein the second number is equal to the first number.

5. The method for uplink data transmission according to claim 1, wherein the step of constructing the new data block further comprises:

decreasing the first power currently allocated to the UE to obtain a second power, if the block error rate is greater than the threshold;

determining the size of the new data block according to the second power, wherein the second power determines the size of the new data block; and constructing the new data block according to the size of the new data block.

6. The method for uplink data transmission according to claim 5, wherein the step of determining the size of the new data block comprises:

determining the size of the new data block according to the following formula of 3G:

MACe_Size=coderate*(4*(Timeslot_Number*704/CodeChannel_Number−17*UCCH_Number)), wherein, MACe_Size is a size of the new data block, coderate is determined according to the second power and the number of code channels, Timeslot_Number is the number of time slots, CodeChannel Number is the number of code channels, and UCCH_Number is the number of UCCHs, and wherein each of Timeslot_Number, CodeChannel_Number and UCCH_Number has a fixed value.

7. A non-transitory computer readable medium storing instructions, which when executed by a processor, cause the processor to perform the following operations:

acquiring a data error rate of data blocks transmitted on an uplink of a UE;

constructing a new data block, wherein a size of the new data block is smaller than the size of the transmitted data blocks if the block error rate is greater than a threshold and constructing the new data block further comprises:

decreasing the first power currently allocated to the UE to obtain a second power, if the block error rate is greater than the threshold;

determining the size of the new data block according to the second power, wherein the second power determines the size of the new data block; and constructing the new data block according to the size of the new data block; and transmitting the new data block on the uplink of the UE according to a first power currently allocated to the UE.

8. The non-transitory computer readable medium according to claim 7, wherein acquiring the data error rate of data blocks transmitted on the uplink of the UE comprises:

acquiring a block error rate of the transmitted data blocks on the uplink of the UE according to feedback messages from a network side with respect to the transmitted data blocks on the uplink of the UE.

9. The non-transitory computer readable medium according to claim 8, wherein acquiring the block error rate of the transmitted data blocks on the uplink of the UE according to feedback messages from the network side with respect to the transmitted data blocks on the uplink of the UE comprises:

acquiring a number of NACKs indicating that the data blocks are not received successfully at the network side from a-first number of the received feedback messages from the network side with respect to the transmitted data blocks on the uplink of the UE; and determining a ratio of the number of NACKs to the first number as the block error rate of the transmitted data blocks on the uplink of the UE.

10. The non-transitory computer readable medium according to claim 9, wherein constructing the new data block comprises:

acquiring a size of the largest data block among the data blocks of a second number of the transmitted data blocks on the uplink of the UE whose feedback message is ACK, wherein an ACK indicates that a corresponding data block is received successfully at the network side, and the second number is equal to the first number; and constructing the new data block according to the size of the largest data block among the data blocks whose feedback message is ACK.

11. The non-transitory computer readable medium according to claim 7, wherein constructing the new data block further comprises:

decreasing the first power currently allocated to the UE to obtain a second power, if the block error rate is greater than the threshold;

determining the size of the new data block according to the second power, wherein the second power determines the size of the new data block; and constructing the new data block according to the size of the new data block.

12. The non-transitory computer readable medium according to claim 11, wherein determining the size of the new data block comprises:

determining the size of the new data block according to the following formula of 3G:

MACe_Size=coderate*(4*(Timeslot_Number*704/CodeChannel_Number−17*UCCH_Number)), wherein, MACe_Size is a size of the new data block, coderate is determined according to the second power and the number of code channels, Timeslot_Number is the number of time slots, CodeChannel_Number is the number of code channels, and UCCH_Number is the number of UCCHs, and wherein each of Timeslot_Number, CodeChannel_Number and UCCH_Number has a fixed value.

13. A non-transitory computer readable medium storing instructions, which when executed by a processor, cause the processor to perform the following operations:

acquiring a data error rate of data blocks transmitted on an uplink of a UE;

constructing a new data block, wherein a size of the new data block is smaller than the size of the transmitted data blocks if the block error rate is greater than a threshold and constructing the new data block comprises:

acquiring a size of the largest data block among the data blocks of a first number of the transmitted data blocks on the uplink of the UE whose feedback message is ACK, wherein an ACK indicates that a corresponding data block is received successfully at the network side; and constructing the new data block according to the size of the largest data block among the data blocks whose feedback message is ACK; and transmitting the new data block on the uplink of the UE according to a first power currently allocated to the UE.

14. The non-transitory computer readable medium according to claim 13, wherein acquiring the data error rate of data blocks transmitted on the uplink of the UE comprises:

acquiring a block error rate of the transmitted data blocks on the uplink of the UE according to feedback messages from a network side with respect to the transmitted data blocks on the uplink of the UE.

15. The non-transitory computer readable medium according to claim 14, wherein acquiring the block error rate of the transmitted data blocks on the uplink of the UE according to feedback messages from the network side with respect to the transmitted data blocks on the uplink of the UE comprises:

acquiring a number of NACKs indicating that the data blocks are not received successfully at the network side from a second number of the received feedback messages from the network side with respect to the transmitted data blocks on the uplink of the UE; and determining a ratio of the number of NACKs to the first second number as the block error rate of the transmitted data blocks on the uplink of the UE.

16. The non-transitory computer readable medium according to claim 15, wherein constructing the new data block further comprises:

acquiring a size of the largest data block among the data blocks of a second number of the transmitted data blocks on the uplink of the UE whose feedback message is ACK, wherein an ACK indicates that a corresponding data block is received successfully at the network side, and the second number is equal to the first number; and constructing the new data block according to the size of the largest data block among the data blocks whose feedback message is ACK.

17. The non-transitory computer readable medium according to claim 13, wherein determining the size of the new data block comprises:

determining the size of the new data block according to the following formula of 3G:

$$MACe\_Size = coderate * (4*(Timeslot\_Number*704/CodeChannel\_Number - 17*UCCH\_Number)),$$

wherein, MACe_Size is a size of the new data block, coderate is determined according to the second power and the number of code channels, Timeslot_Number is the number of time slots, CodeChannel_Number is the number of code channels, and UCCH_Number is the number of UCCHs, and wherein each of Timeslot_Number, CodeChannel_Number and UCCH_Number has a fixed value.

* * * * *